United States Patent
Song et al.

(10) Patent No.: US 12,541,459 B2
(45) Date of Patent: Feb. 3, 2026

(54) METHOD AND SYSTEM USING AI CALL PREDICTION AND CACHE

(71) Applicant: Visa International Service Association, San Francisco, CA (US)

(72) Inventors: Hongqin Song, Austin, TX (US); Yu Gu, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 529 days.

(21) Appl. No.: 17/624,812

(22) PCT Filed: Jul. 5, 2019

(86) PCT No.: PCT/US2019/040722
§ 371 (c)(1),
(2) Date: Jan. 4, 2022

(87) PCT Pub. No.: WO2021/006861
PCT Pub. Date: Jan. 14, 2021

(65) Prior Publication Data
US 2022/0206947 A1    Jun. 30, 2022

(51) Int. Cl.
G06F 12/08    (2016.01)
G06F 12/0875    (2016.01)
G06N 3/02    (2006.01)

(52) U.S. Cl.
CPC .......... *G06F 12/0875* (2013.01); *G06N 3/02* (2013.01); *G06F 2212/604* (2013.01)

(58) Field of Classification Search
CPC .......... G06N 7/005; G06N 20/00; G06N 3/08; G06N 3/0454; G06N 5/003; G06N 5/04;
(Continued)

(56) References Cited

U.S. PATENT DOCUMENTS

2010/0125849 A1    5/2010 Oswald et al.
2014/0229610 A1    8/2014 Shen et al.
(Continued)

FOREIGN PATENT DOCUMENTS

CN    101951395 A    1/2011
CN    103416021 A    11/2013
(Continued)

OTHER PUBLICATIONS

Mesbahi et al., Load Balancing in Cloud Computing: A State of the Art Survey, 2016, I.J Modern Education and Computer Science, 2016, 3, 64-78 (Year: 2016).*
(Continued)

*Primary Examiner* — Van C Mang
(74) *Attorney, Agent, or Firm* — Kilpatrick Townsend & Stockton LLP

(57) ABSTRACT

Methods and systems of predicting and processing cacheable AI calls are disclosed. One method includes determining, by a call prediction processing computer, that an AI computer is operating below a threshold processor usage. The method then includes requesting, by the call prediction processing computer, a set of cacheable requests from an orchestration service computer and receiving, from the orchestration service computer, the set of cacheable requests. Then the method includes sending, by the call prediction processing computer, a cacheable request from the set of cacheable requests to the AI computer. The method then includes receiving, by the call prediction processing computer, an output. The output is generated by the AI computer based on the cacheable request. Then the call prediction processing computer stores the output in a data repository.

14 Claims, 6 Drawing Sheets

(58) Field of Classification Search
CPC ...... G06N 20/10; G06N 3/0445; G06N 20/20; G06N 3/008; G06N 3/0472

See application file for complete search history.

(56) References Cited

U.S. PATENT DOCUMENTS

| | | |
|---|---|---|
| 2014/0337648 A1 | 11/2014 | Ujibashi |
| 2015/0067688 A1 | 3/2015 | Nagasawa et al. |
| 2018/0285413 A1 | 10/2018 | Vora et al. |
| 2018/0308018 A1 | 10/2018 | Bansal et al. |

FOREIGN PATENT DOCUMENTS

| | | |
|---|---|---|
| CN | 106255150 A | 12/2016 |
| CN | 107948254 A | 4/2018 |
| CN | 108449214 A | 8/2018 |
| CN | 108805604 A | 11/2018 |
| CN | 108809694 A | 11/2018 |
| CN | 108833352 A | 11/2018 |
| CN | 109716346 A | 5/2019 |
| CN | 109783337 A | 5/2019 |
| KR | 20070019372 A | 2/2007 |

OTHER PUBLICATIONS

Sharma et al., Deep Learning Approaches for Question Answering System, 2018, Procedia Computer Science 132 (2018) 785-794 (Year: 2018).*

Hsu et al., Optimizing Energy Consumption with Task Consolidation in Clouds, 2012, Information Sciences (2014), pp. 452-462 (Year: 2012).*

Kelley et al., Obtaining and Managing Answer Quality for Online Data-Intensive Services, 2017 (Year: 2017).*

Cambazoglu et al., A Refreshing Perspective of Search Engine Caching, 2010, WWW 2010, pp. 181-190 (Year: 2010).*

Cao, Guohong, Proactive Power-Aware Cache Management for Mobile Computing Systems, 2002, IEEE Transactions on Computers, vol. 51, No. 6, Jun. 2002 (Year: 2002).*

Lempel et al., Predictive Caching And Prefetching Of Query Results In Search Engines (Year: 2003).*

Acharjee, Personalized And AI Web Caching And Prefetching (Year: 2006).*

Sarwar et al., A Hybrid Intelligent System To Improve Predictive Accuracy For Cache Prefetching (Year: 2012).*

Narayanan et al., DeepCache: A Deep Learning Based Framework For Content Caching, 2018 (Year: 2018).*

PCT/US2019/040722, "International Search Report and Written Opinion", Apr. 3, 2020, 9 pages.

Application No. CN201980097937.6, Office Action, Mailed On May 7, 2024, 15 pages.

Hong et al., "The Prefetching and Caching Strategy of Metadata in GridDaEn Data Grid", Computer Engineering & Science, Issue S1, Oct. 15, 2009,.

Li et al., "Sequential Patterns-Based Cache Replacement in Servlet Container", Journal of Software, Issue 7, Jul. 15, 2007.

Shen et al., "Algorithm For Load-balancing Of Clustered Servers Dealing With Mixed Pages Requests", Computer Engineering and Applications, Issue 18, Apr. 18, 2018.

Shrawankar et al., "Pattern Based Real Time Disk Scheduling Algorithm For Virtualized Environment", 2013 6th International Conference on Emerging Trends in Engineering and Technology, Dec. 31, 2013, pp. 177-182.

Xia et al., "Design of I/O Server Based on Transparent Calculation Model", Computer Engineering, Issue 21, Nov. 5, 2006,.

Application No. CN201980097937.6, Office Action, Mailed On Nov. 6, 2024, 20 pages, with English Language Summary.

Application No. CN201980097937.6, Notice of Decision to Grant, Mailed On Mar. 5, 2025, 7 pages with English Translation.

\* cited by examiner

METHOD AND SYSTEM USING AI CALL PREDICTION AND CACHE

CROSS REFERENCE(S) TO RELATED APPLICATIONS

This application is a National Stage of International Application No. PCT/US2019/040722, filed on Jul. 5, 2019, which is herein incorporated by reference in its entirety for all purposes.

BACKGROUND

As artificial intelligence (AI) technologies (such as machine learning, natural language processing, and knowledge representation) advance, they are becoming increasingly important. AI can be used to analyze topics as diverse as meteorological predictions, business decisions, and astronomical theory. AI models, however, can be very expensive to run, requiring a large amount of processing power which can translate to expensive servers, space, and energy. Individuals may not have the resources to run complex machine learning models and thus may rely on services with supercomputer or large computing clusters that can process data and run models for them. AI computing services may then want to optimize their services. In particular, they want to optimize so as not to waste valuable processing time as well as ensuring that the service can scale to process queries from a large number of clients. During peak times, a large number of prediction requests can be received, and each prediction request may require one or more models to be run for a long time. This can lead to strain on the system and long wait times. Conversely, at off-peak times, very few requests may come in resulting in a lot of idle time for the system. Increasing processing power to support high demand at peak times is costly, and can result in increased idle processing power during off-peak times.

In a previous system, a user may send a request for a prediction to a computer. The computer can retrieve contextual data related to the prediction request, and then sends the prediction request to an AI computer. The AI computer can process the prediction request and generate an output. The output is then returned to the user device through the computer. The work of the AI computer is thus limited to the requests received from the user devices.

Embodiments address these and other problems individually and collectively.

BRIEF SUMMARY

One embodiment includes determining, by a call prediction processing computer, that an AI computer is operating below a threshold processor usage. The method then includes requesting, by the call prediction processing computer, a set of cacheable requests from an orchestration service computer and receiving, by the call prediction processing computer from the orchestration service computer, the set of cacheable requests. Then the method includes sending, by the call prediction processing computer, a cacheable request from the set of cacheable requests to the AI computer. The method then includes receiving, by the call prediction processing computer, an output, wherein the output is generated by the AI computer based on the cacheable request and initiating storing, by the call prediction processing computer, the output in a data repository.

Another embodiment includes a system comprising a call prediction processing computer, the call prediction computer comprising a processor and a computer-readable medium, the computer-readable medium comprising code for implementing a method that includes determining that an AI computer is operating below a threshold processor usage. The method then includes requesting a set of cacheable requests from an orchestration service computer and receiving, from the orchestration service computer, the set of cacheable requests. Then the method includes sending a cacheable request from the set of cacheable requests to the AI computer. The method then includes receiving an output, wherein the output is generated by the AI computer based on the cacheable request and initiating storing the output in a data repository.

Another embodiment includes receiving, by an orchestration service computer, a prediction request message comprising a prediction request in the form of an AI call from a user device and determining, by the orchestration service computer, that the prediction request is a cacheable request. Then the method includes retrieving, by the orchestration service computer, contextual data from a data repository and modifying, by the orchestration service computer, the prediction request message to include the contextual data. The method also includes sending, by the orchestration service computer, the prediction request message to an AI computer, the prediction request message comprising the AI call and the contextual data. The method then includes receiving, by the orchestration service computer from the AI computer, an output responsive to the prediction request message and sending, by the orchestration service computer, the output to the user device. Then the method includes initiating, by the orchestration service computer, storage of the prediction request and the output in the data repository.

Another embodiment includes a system comprising an orchestration service computer, the orchestration service computer comprising a processor and a computer-readable medium, the computer-readable medium comprising code to implement a method that includes receiving a prediction request message comprising a prediction request in the form of an AI call from a user device and determining that the prediction request is a cacheable request. Then the method includes retrieving contextual data from a data repository and modifying the prediction request message to include the contextual data. The method then includes sending the prediction request message to an AI computer, the prediction request message comprising the AI call and the contextual data. The method then includes receiving, from the AI computer, an output responsive to the prediction request message and sending the output to the user device. Then the method includes initiating storage of the prediction request and the output in the data repository.

Further details regarding embodiments of the invention can be found in the Detailed Description and the Figures.

DETAILED DESCRIPTION

Figure 1:
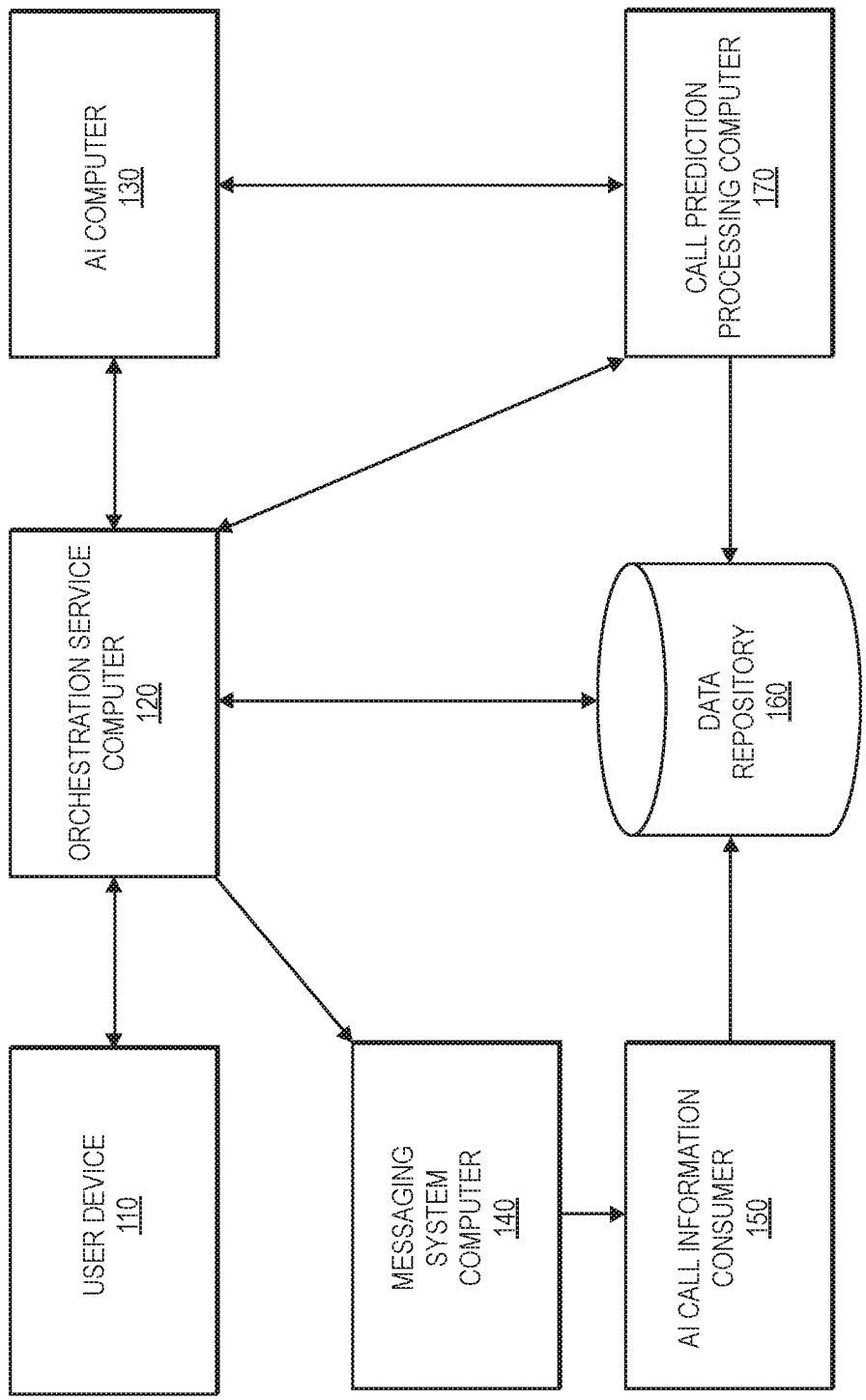
FIG. 1 shows a block diagram of a system according to embodiments.

Embodiments can improve efficiency of an AI engine service by introducing a cache. Caching results can improve efficiency in artificial intelligence computations, which can be costly in terms of computational and financial resources. Additionally, embodiments introduce a system for predicting future requests to the AI engine, which can play a part in predicting future requests made to the AI engine and create those requests in advance and then cache the results.

A cacheable request can be a request that is repeatable and that would likely give the same result if asked again within a reasonable time frame. A cacheable request is one where the contextual data is not time dependent. An example of a cacheable request may be "Where is the best place to open a new pizzeria in San Francisco?" "San Francisco" in this example is an example of geographical input data and is stable over time. Thus, a cacheable request that is asked at two different times (e.g., a week apart) may give the same result.

Conversely, a non-cacheable request may be one that is time dependent and/or depends on time dependent data. For example, a non-cacheable request may relate to transaction fraud risk such as "What is the fraud score for this transaction?" Each transaction fraud risk determination may depend on the entities involved, the details of the transaction, the time of the transaction, etc. Thus, a cached transaction fraud risk response to a transaction fraud risk request may no longer be relevant after the transaction has been processed, because the transaction will only occur one time.

Prior to discussing embodiments of the invention, some terms can be described in further detail.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device, a laptop or desktop computer, a wearable device, etc.

A "user" may include an individual or a computational device. In some embodiments, a user may be associated with one or more user devices and/or personal accounts. In some embodiments, the user may be a cardholder, account holder, or consumer.

A "processor" may include any suitable data computation device or devices. A processor may comprise one or more microprocessors working together to accomplish a desired function. The processor may include CPUs comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "prediction request" may be a request for a predicted answer to a question. For example, a prediction request may be a request for some information about a future event, a classification prediction, an optimization, etc. The prediction request may be in the form of natural language (e.g., as an English sentence) or may be in a computer-readable format (e.g., as a vector). The answer to a prediction request may or may not be determined using artificial intelligence.

A "prediction request message" may be a message sent to an entity (e.g., an orchestration service computer, an AI computer with an AI engine) with a prediction request.

An "AI call" may be a command to execute a subroutine, particularly an artificial intelligence model. The AI call may be in the form of natural language (e.g., as an English sentence) or may be in a in a computer-readable format (e.g., as a vector). An AI call may specifically be a command to get a result from some form of AI engine (machine learning, natural language processing, knowledge representation, etc.).

A "call information message" may be a message with information about an AI call and/or a prediction request. A call information message may include a prediction request (or an AI call) and an output generated based on the prediction request (or AI call). The call information message may also include information such as contextual data used in the generating the output, an identifier of the contextual data, and a time stamp of the prediction request.

A "threshold processor usage" may be a threshold on an amount of computer processing power that is used. For example, a threshold may be a percentage of processor usage, such as 20%. As another example, threshold processor usage may be based on a number of hardware units, such as a number of processor cores in use. In some embodiments, the threshold may be determined such that there is sufficient processor operational capacity to perform call prediction processing while still processing incoming prediction request without diminishing the speed or performance of the processor.

A "cacheable request" can be an inquiry that can be stored. A cacheable request may be one where the request is static in time. It may be static because the input (and output) is not time dependent, and thus the output can be saved for a period of time. The cacheable request may also be a prediction request. If the same prediction request is received in the same period of time, the original output is still be valid. The request may be static over a period of time such as one week or one month (or more or less than these).

An "AI engine" may comprise a plurality of modules with artificial intelligence capabilities. Each module may perform tasks to one or more different areas of artificial intelligence, such as machine learning, natural language processing, and knowledge representation. The AI engine may be able to integrate the models to, for example, use the natural language processing module to process a question and then use the machine learning module to generate a prediction in response to the question.

"Contextual data" may include data that provides circumstances surrounding an event, entity, or item. Contextual data may be additional information that gives a broader understanding or more detail about existing information or requests (e.g., prediction request, AI call). In embodiments, contextual data may include transaction histories, geographic data, census data, etc.

FIG. 1 shows a block diagram of a system 100 according to embodiments. System 100 may comprise a user device 110, an orchestration service computer 120, an AI computer 130, a messaging system computer 140, an AI call information consumer 150, a data repository 160, and a call prediction processing computer 170. Any of the devices in FIG. 1 may be in communication with each other via a suitable communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

User device 110 may be a device that a user can use to request predictions from an AI engine of the AI computer 130 through the orchestration service computer 120. Examples of a user device 110 may include a laptop, desktop computer, mobile device.

Orchestration service computer 120 may process prediction requests. The orchestration service computer 120 may act as a router to route messages to appropriate computers. Orchestration service computer 120 may also determine and/or retrieve contextual data associated with a prediction request. In some embodiments, orchestration service computer 120 may also determine predictions for future cacheable prediction requests.

AI computer 130 may be a computer with an AI engine. The AI computer 130 may have a plurality of models available to complete different tasks. For example, the AI computer 130 may have a fraud detection model, a business location model, and natural language processing model. The AI engine of AI computer 130 may use models individually and/or in combination.

Messaging system computer 140 may comprise message-oriented middleware. For example, the messaging system computer 140 may operate with RabbitMQ or Apache Kafka. The messaging system computer 140 may be a server computer. The messaging system computer 140 may receive messages from entities known as producers, which may include orchestration service computer 120 and/or call prediction processing computer 170. A producer may be an entity that generates messages with information that other entities may use later. Messaging system computer 140 may receive call information messages from the orchestration service computer 120. Call information messages may include cacheable requests, outputs based on the cacheable requests, and contextual data. The messaging system computer 140 may additionally receive other information, such as contextual data from other producers. The messaging system computer 140 can process the information, and arrange the call information messages into one or more queues or partitions.

AI call information consumer 150 may read call information messages from messaging system computer 140. After reading the call information message, the AI call information consumer 150 can store the information in the call information message in the data repository 160.

Data repository 160 may store information including cacheable requests, outputs generated from the cacheable requests, and contextual data. The data repository 160 may persist information for a period of time (e.g., one day, one week, one month). The period of time to cache an output may be part of the output. The data repository 160 may also store contextual data such as transaction data, business data, geographic data, etc. Data repository 160 may be a non-relational database (a NoSQL database).

Call prediction processing computer 170 may process predictions about prediction requests (e.g., AI calls) that users will send to AI computer 130 in the future. Call prediction processing computer may also send prediction requests to AI computer 130 and/or orchestration service computer 120. Call prediction processing computer 170 may be in communication with AI computer 130 to monitor processor usage.

Figure 2:
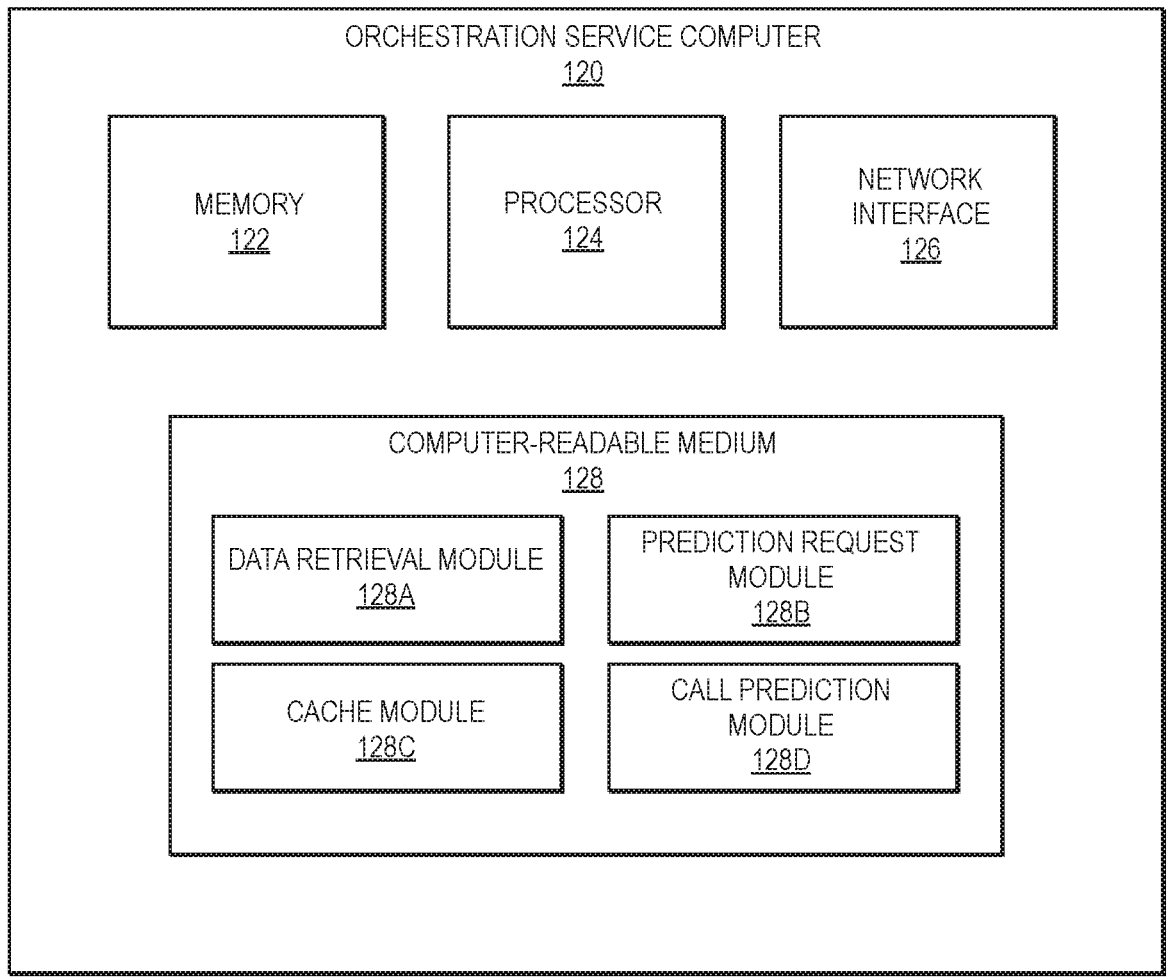
FIG. 2 shows a block diagram of an orchestration service computer according to embodiments.

FIG. 2 shows a block diagram of an orchestration service computer 120 according to embodiments. Orchestration service computer 120 may comprise a memory 122, a processor 124, a network interface 126, and a computer-readable medium 128. Computer-readable medium 128 may store code executable by the processor 124 for implementing some of all of the functions of orchestration service computer 120. Computer-readable medium 128 may include a data retrieval module 128A, a prediction request module 128B, a cache module 128C, and a call prediction module 128D.

The memory 122 may be implemented using any combination of any number of non-volatile memories (e.g., flash memory) and volatile memories (e.g., DRAM, SRAM), or any other non-transitory storage medium, or a combination of media.

The processor 124 may be implemented as one or more integrated circuits (e.g., one or more single core or multicore microprocessors and/or microcontrollers). The processor 124 may be used to control the operation of the orchestration service computer 120. The processor 124 can execute a variety of programs in response to program code or computer-readable code stored in memory 122. The processor 124 may include functionality to maintain multiple concurrently executing programs or processes.

Network interface 126 may be configured to connect to one or more communication networks to allow orchestration service computer 120 to communicate with other entities such as user device 110, AI computer 130, etc. For example, communication with the AI computer 130 can be direct, indirect, and/or via an API.

Computer-readable medium 128 may comprise one or more non-transitory media for storage and/or transmission. Suitable media include, as examples, a random access memory (RAM), a read only memory (ROM), a magnetic medium such as a hard-drive, or an optical medium such as a CD (compact disk) or DVD (digital versatile disk), flash memory, and the like. The computer-readable medium 128 may be any combination of such storage or transmission devices.

Data retrieval module 128A, in conjunction with the processor 124, may retrieve contextual data from data repository 160. The contextual data retrieved may relate to a prediction request. For example, for a prediction request about an optimal location for a new hotel in San Francisco, the data retrieval module 128A, in conjunction with the processor 124, can retrieve contextual data, for example, about tourism in San Francisco, existing hotel locations, hospitality transaction histories, etc.

Prediction request module 128B, in conjunction with the processor 124, can process prediction requests. Processing prediction requests may include determining if a prediction request is cacheable. If it is cacheable and is already in the cache, the cache module 128C, in conjunction with the processor 124, may retrieve the cached output of the prediction request. The prediction request module 128B can, in conjunction with the processor 124, also determine what contextual data is needed for a prediction request, and then work with the data retrieval module 128A to retrieve that data from a data repository. Alternatively, the prediction request module 128B may just receive the contextual data from the data retrieval module 128A without determining the relevant contextual data first (i.e., the data may be determined by the data retrieval module). The prediction request module 128B may also send prediction requests, along with relevant contextual data.

Cache module 128C, in conjunction with the processor 124, can cache and retrieve cacheable requests. Cache module 128C can initiate storing cacheable requests in the data repository. Cache module 128C may initiate storing cacheable requests by sending prediction requests, outputs, and contextual data to a messaging system computer. Additionally, cache module 128C may retrieve cached results from the data repository.

Call prediction module 128D, in conjunction with the processor 124, may predict what cacheable requests are likely to be made. The call prediction module 128D may store past prediction requests, along with a timestamp of when the cacheable request was made. The call prediction module 128D may use frequency to determine when a prediction request may be made. For example, call prediction module 128D may determine that a particular cacheable request is made by various users every week. The call prediction module 128D may also predict cacheable requests based on date. For example, cacheable requests such as "Where is the best place to open a Halloween costume shop?" may be received in the fall each year. Alternatively, call prediction module 128D, in conjunction with the processor 124, may send a request to an AI computer for a set of predicted cacheable requests. The cacheable requests predicted by the call prediction module 128D may be used by call prediction processing computer to generate prediction requests before they are received by the orchestration service computer 120 from a user device.

Figure 3:
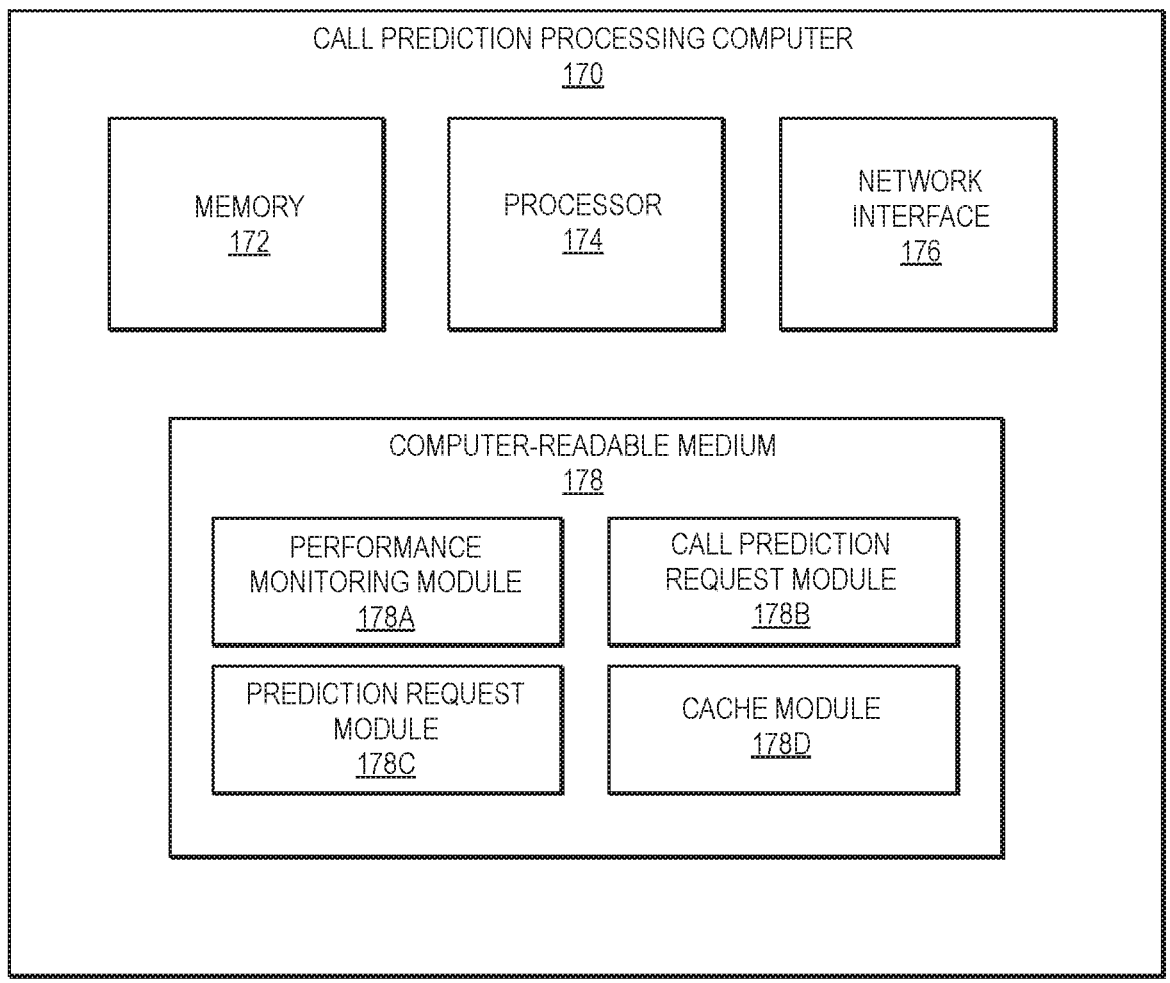
FIG. 3 shows a block diagram of a call prediction processing computer according to embodiments.

FIG. 3 depicts a call prediction processing computer 170 according to embodiments. Call prediction processing computer 170 may comprise a memory 172, a processor 174, a network interface 176, and a computer-readable medium 178. These components may be similar to or different than the corresponding components in the orchestration service computer 120 of FIG. 2. Computer-readable medium 178 may store code executable by the processor 174 for implementing some or all of the functions of call prediction processing computer 170 described herein. Computer-readable medium 178 may comprise a performance monitoring module 178A, a call prediction request module 178B, a prediction request module 178C, and a cache module 178D.

Performance monitoring module 178A, in conjunction with the processor 174, may monitor the processor usage (e.g., CPU utilization) of AI computer 130. The performance monitoring module 178A may determine an amount of processing power that the AI computer 130 is using (e.g., the number of processor cores, the amount of non-idle time), and may determine if the processor usage is below a predetermined threshold. Example thresholds may be a percentage, such as, 20%, 30%, etc. The threshold may be chosen, such that there is sufficient processor operational capacity to perform call prediction processing without diminishing the speed or performance of the processor from processing incoming prediction requests.

In some embodiments, the performance monitoring module 178A may have direct access to the hardware of the AI computer 130. Alternatively, the performance monitoring module 178A may receive information from the AI computer 130 (e.g., from the performance monitoring software of AI computer 130) about processor usage. Performance monitoring module 178A may operate on a schedule. For example, performance monitoring module 178A may check the processor usage every 5 minutes. If the processor usage is above the threshold, the call prediction processing computer 170 may wait until the next scheduled time. If the processor usage is below the threshold, the performance monitoring module 178A, in conjunction with the processor 174, may cause the call prediction processing computer 170 to activate call prediction request module 178B.

Call prediction request module 178B, in conjunction with the processor 174, may send requests to orchestration service computer 120 for predicted cacheable requests. The call prediction request module 178B may receive a set of cacheable calls from the orchestration service computer 120. The call prediction request module 178B may specify a number of cacheable calls that are requested. For example, the call prediction request module 178B may request the N requests most likely to be requested. For example, if it is December, cacheable calls might include "Where can I find a gift for my wife?"; "How late is Acme store open on Christmas Eve?"; and "What is the best meal to cook on Christmas?" Call prediction request module 178B can be triggered by the performance monitoring module 178A determining that AI computer 130 is operating below a threshold processor usage.

Prediction request module 178C, in conjunction with the processor 174, can send prediction requests to the orchestration service computer, in particular, cacheable requests. The prediction request module 178C may select a particular cacheable request from a set of cacheable requests received from orchestration service computer 120. For example, the prediction request module 178C may prioritize the set of cacheable requests. Alternatively the prediction request module 178C may select a random cacheable call from the set of cacheable requests.

Cache module 178D, in conjunction with the processor 174, may initiate storing outputs to cacheable requests in data repository 160. Cache module 178D, in conjunction with the processor 174, may store cacheable requests and outputs responsive to the cacheable requests in the data repository 160. Alternatively, the cache module 178D, in conjunction with the processor 174, may send a call information message comprising a cacheable request and output to a message system computer.

Figure 4:
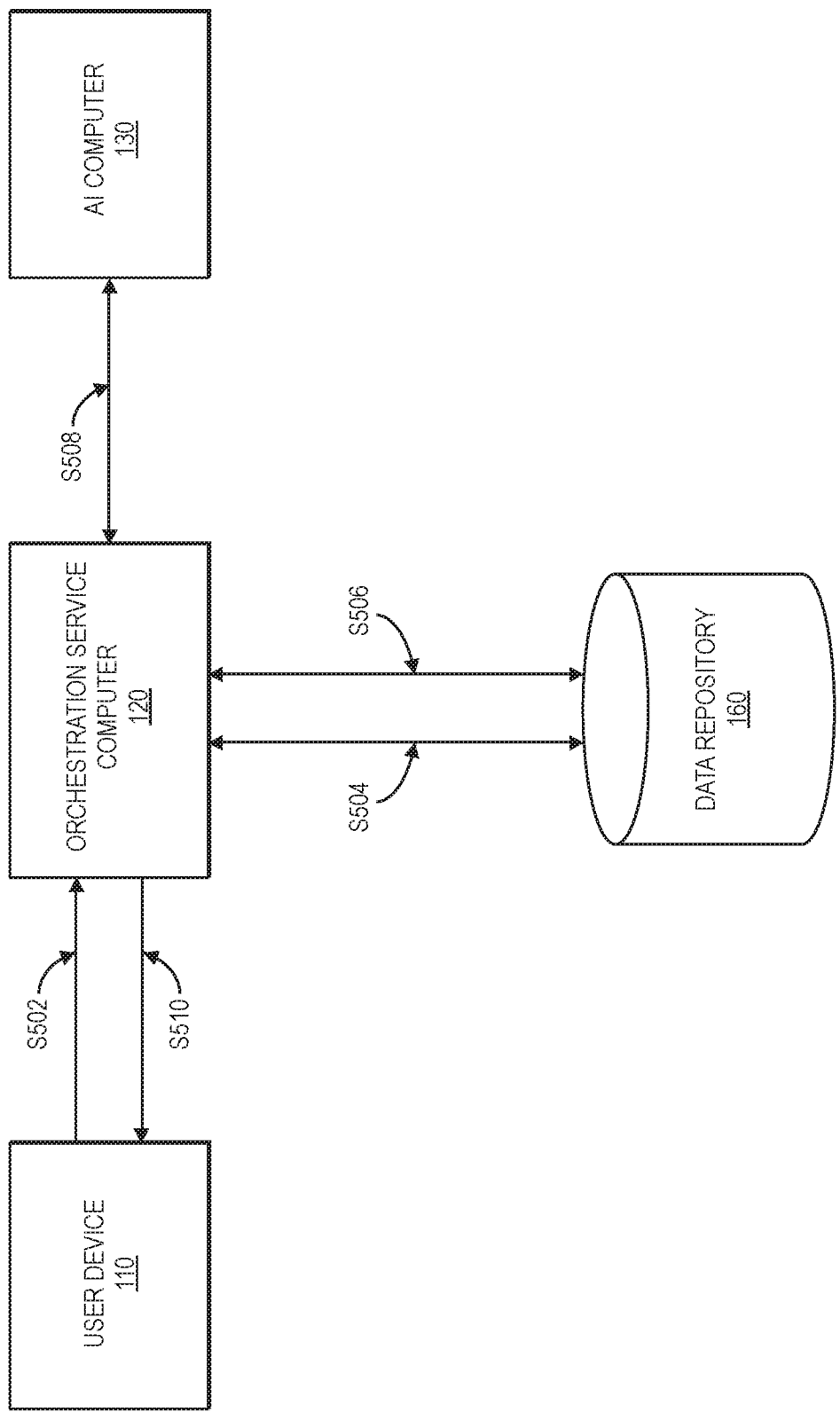
FIG. 4 shows a flow diagram of a prediction request process according to embodiments.

FIG. 4 shows a flow diagram of a processing a prediction request according to embodiments.

In step S502, user device 110 may send a prediction request message to an orchestration service computer 120. The prediction request message may comprise a prediction request, which may be in the form of a question. The prediction request may be in the form of an AI call. An AI call may be an input for an AI engine. An example prediction request may be "Where is the best place to build a hotel in Austin, Texas?" Another example of a prediction request may be "Is this transaction fraudulent?". The prediction request message may be sent to the orchestration service computer 120 through a web service, a API, etc. For example, there may be a web interface that allows user device 110 to send prediction request messages to the orchestration service computer 120.

In step S504, orchestration service computer 120 may determine that the prediction request is a cacheable request. For example, the question "Where is the best place to build a hotel in Austin, Texas?" may be a cacheable request, while the question "Is this transaction fraudulent?" may be a non-cacheable request. If the prediction request is a cacheable request, the orchestration service computer 120 may attempt to retrieve the output of the prediction request from data repository 160, if the output has been previously cached. If the output is in the data repository 160, the orchestration service computer 120 may return the output to user device 110. A cacheable request may be a request that is relatively time independent.

If the output of the prediction request is not stored in the data repository 160, the orchestration service computer 120 may evaluate the context of the prediction request and/or the user device 110 to determine if the prediction request is a cacheable request. For example, if the user device 110 is a computer of a processing network (e.g., a payment processing network), the orchestration service computer 120 may infer that the prediction request is a transaction fraud request and is not a cacheable request. Alternatively, if the user device 110 is a laptop computer of a person, the orchestration service computer 120 may infer that the prediction request is a cacheable request, or there may be a higher probability that the prediction request is a cacheable request. In some embodiments, the orchestration service computer 120 may use the AI computer 130 to determine if the prediction request is cacheable, for example, using a machine learning model of the AI computer 130.

In step S506, orchestration service computer 120 can retrieve contextual data relating to the prediction request from data repository 160. For example, if the prediction request is "Where is the best place to build a hotel in Austin, Texas?", then the orchestration service computer 120 may retrieve information such as geographic information about Austin, locations of existing hotels and tourist attractions in Austin, transaction patterns in Austin, etc. In some embodiments, the prediction request message may include contextual data.

In step S508, orchestration service computer 120 can send the prediction request message, comprising the AI call (i.e., the prediction request) and the contextual data, to the AI computer 130. The AI computer 130 can use an AI engine to process the AI call with an AI model or a combination of models and generate an output responsive to the prediction request message. Examples of AI models may include a machine learning model, a neural network, a recurrent neural network, a support vector machine, a Bayesian network, a genetic algorithm, etc. For example, the AI engine may analyze the contextual data (e.g., existing hotel locations, hospitality transaction patterns) with a business optimization learning model to determine where to build a new hotel. In some embodiments, the AI engine may use a natural language processing module to parse the prediction request.

In some embodiments, the output from the AI computer 130 may also include a period of time that the output for the prediction request should be persisted in the data repository. For example, the period of time may be 3 days, 1 week, 1 month, etc. The period of time may depend on the frequency with which the cacheable request is requested by users. For example, a cacheable request that is made hourly may be stored for 3 days or a week, while a cacheable request that is made weekly may be stored for one month. The period of time may also depend on the contextual data associated with the cacheable request. For example, an output may depend upon contextual data that is refreshed monthly. Thus, an output that is based on that contextual data may be cached for a time period of one month.

The orchestration service computer 120 may then receive the output to the prediction request from the AI computer 130. The output may be, for example, an address of an optimized location of a new hotel, a list of addresses, a neighborhood in which to build a new hotel, etc.

In step S510, orchestration service computer 120 may send the output to the user device 110.

After receiving the output, the orchestration service computer 120 can initiate the storage of the prediction request and output in the data repository 160. In some embodiments, initiating the storage of the prediction request may include a process such as that of FIG. 5, which is described in further detail below. In other embodiments, the orchestration service computer 120 may store the prediction request and output in the data repository directly. The orchestration service computer 120 may also store the contextual data and/or a reference to the location of the contextual data in the data repository 160.

The prediction request message may be a first prediction request message with a first prediction request in the form of a first AI call. The orchestration service computer 120 may then receive a second prediction request in a second prediction request message at a subsequent time, but during the time period that the output is stored in the data repository 160. The second prediction request may be in the form of a second AI call. The second prediction request message may be received from a second user device (not shown) operated by the same or different user as the user of the first user device 110. In some embodiments, the second user device may be the same as the first user device 110. Alternatively, the second user device may be operated by a second user. The orchestration service computer 120 may then determine that the second prediction is a cacheable request, using the process as described in step S504.

The orchestration service computer 120 may then determine that the second prediction request corresponds to the first prediction request. In one embodiment, the orchestration service computer 120 may attempt to retrieve the second prediction request from the data repository 160. If the second prediction request is in the data repository 160, as the first prediction request, the orchestration service computer 120 may determine that the second prediction request corresponds to the first prediction request. In another embodiment, the orchestration service computer 120 may directly associate the second prediction request with the first prediction request.

The orchestration service computer 120 can then retrieve the output from the data repository 160 associated with the first prediction request and the second prediction request. The orchestration service computer 120 can then send the output to the second user device.

Figure 5:
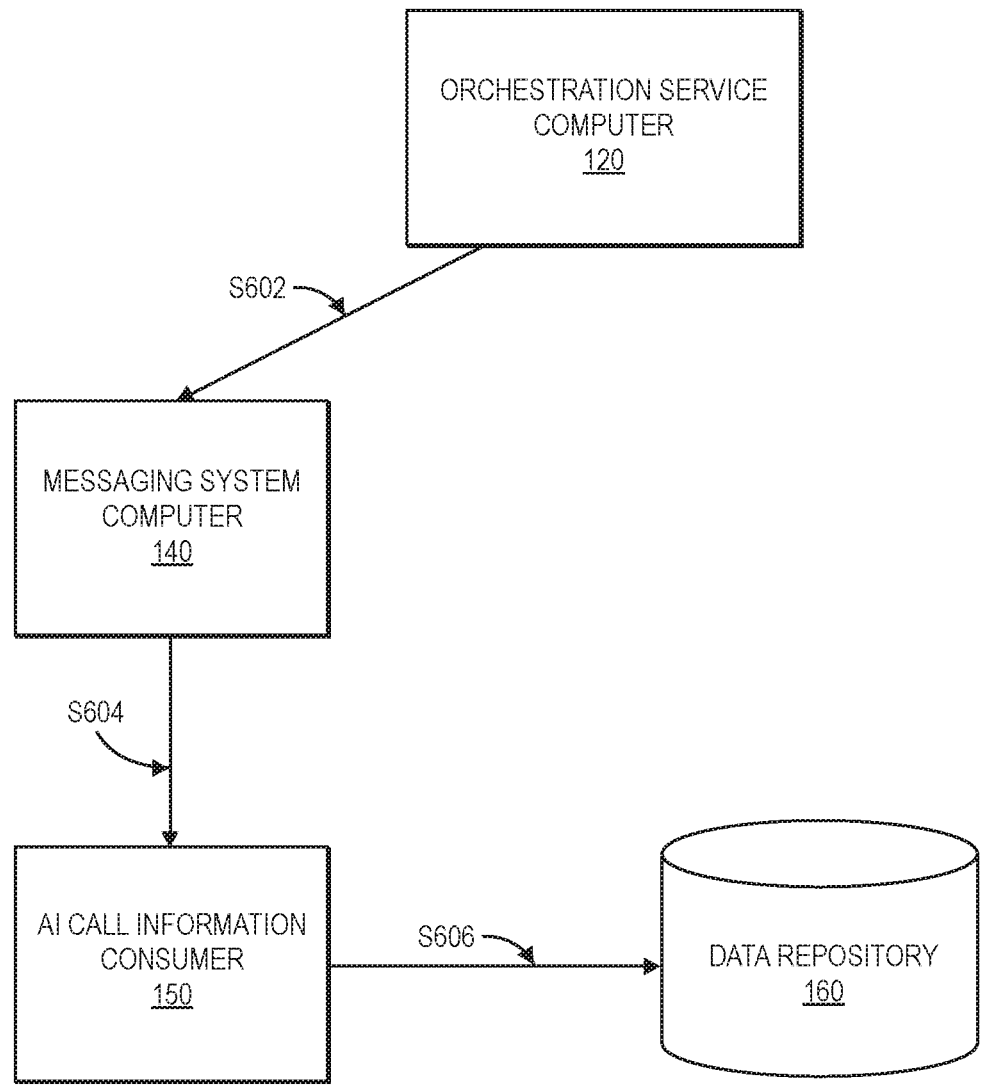
FIG. 5 shows a flow diagram of a caching process according to embodiments.

FIG. 5 shows a flow diagram of caching an output using a messaging system according to embodiments. The process of FIG. 5 may occur, in some embodiments, immediately after the process of FIG. 4. Alternatively, the process may occur at the end of the day, at once per hour, or at some other suitable time.

In step S602, orchestration service computer 120 may send a call information message to a messaging system computer 140. The messaging system computer 140 may receive the call information message and store the call information message in a queue. The call information message may comprise a prediction request, an output responsive to the prediction request, and contextual data. For example, the prediction request may be a question such as "Where is the best place to build a new restaurant in San Francisco?" and the output may then be a location (e.g., an address, a neighborhood) determined by an AI engine as an optimal place to build a restaurant. The contextual data may include, for example, geographic data of San Francisco, locations of existing restaurants, and food transaction information from the past six months. In some embodiments, the call information message may comprise an identifier of the contextual data in data repository 160 (e.g., a location in memory, a key) instead of the contextual data itself.

In step S604, an AI call information consumer 150 may be subscribed to the messaging system computer 140 and receive the call information message when it is posted to the queue. The AI call information consumer 150 may additionally, or alternatively, retrieve information from the queue at will. For example, the AI call information consumer 150 may retrieve and store one call information message in the data repository 160 at a time. The AI call information consumer 150 may retrieve call information messages from the queue at a slower or faster rate than they are sent by the orchestration service computer 120.

In step S606, AI call information consumer 150 may store the call information message in data repository 160. In some embodiments, the prediction request, output, and/or contextual data may be stored separately in the data repository 160 instead of as a single call information message. The prediction request, output, and/or contextual data may be stored with an identifier to associate them in the database. In some embodiments, the contextual data may already be in the data repository 160. The AI call information consumer 150 may store identifiers of the contextual data in the data repository 160. Additionally, or alternatively, the prediction request message may have included new contextual data that was not in previously in the data repository 160, and the new contextual data may be stored in the data repository.

Figure 6:
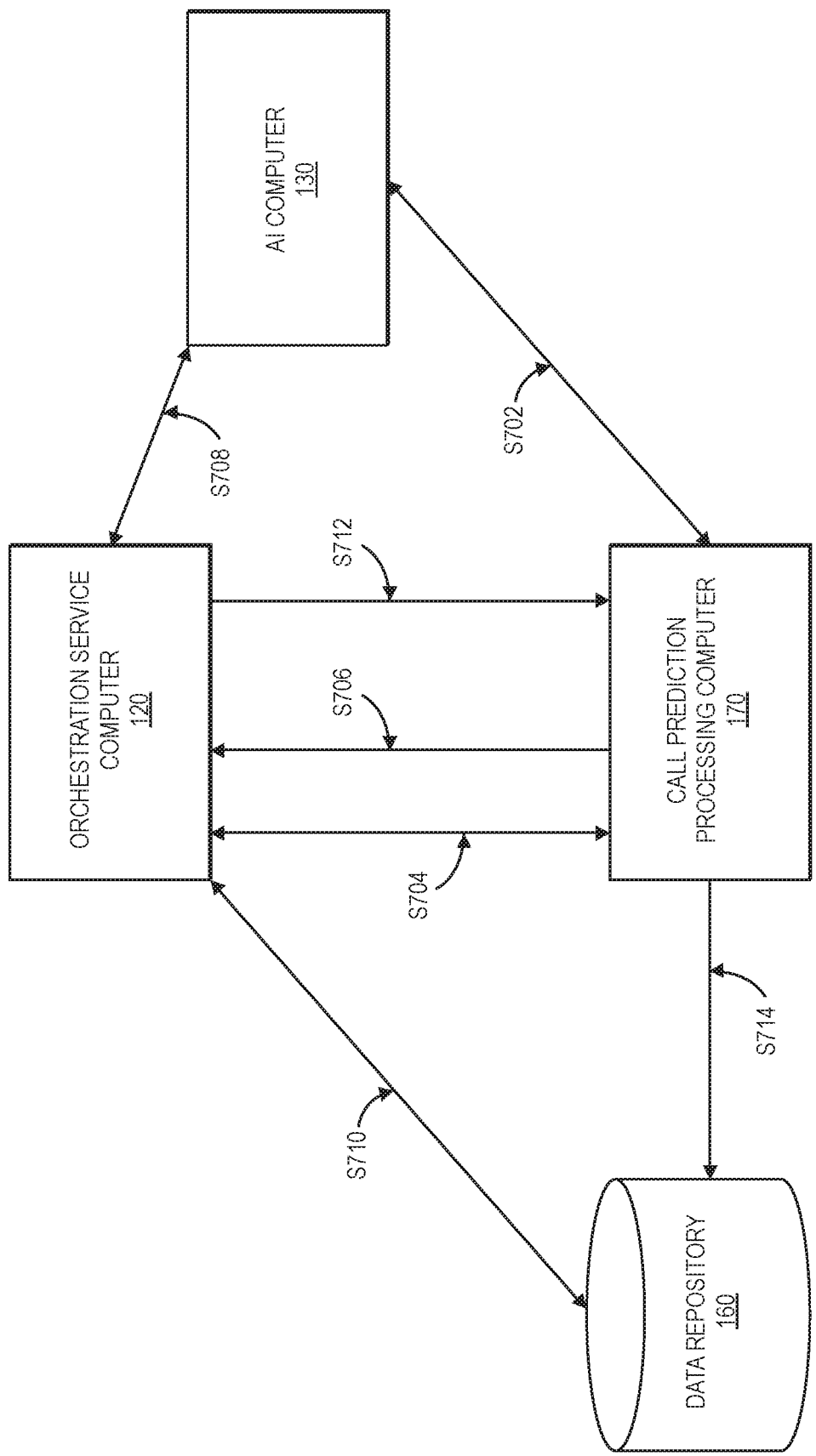
FIG. 6 shows a flow diagram of a call prediction process according to embodiments.

FIG. 6 shows a flow diagram for performing a call prediction process according to embodiments.

In step S702, the call prediction processing computer 170 may determine that the AI computer 130 is operating below a threshold processor usage. Call prediction processing computer 170 may do so by monitoring the performance of AI computer 130. For instance, in some embodiments, call prediction processing computer 170 may operate on a schedule. For example, call prediction processing computer 170 may check the AI computer 130 every 5 minutes, every hour, etc. The threshold may be, for example, 20% of the AI computer's operating capacity. If the AI computer 130 is operating above the threshold, the call prediction processing computer 170 may sleep until the next time that it checks the AI computer 130.

In step S704, call prediction processing computer 170 may request a set of cacheable requests from the orchestration service computer 120 after determining that the AI computer 130 is operating below the threshold. The set of cacheable requests may include one or more cacheable requests. The orchestration service computer 120 may directly determine the set of cacheable requests or may communicate with the AI computer 130 to determine them. For example, it can maintain a list of cacheable requests that it receives, as well as the time and/or number of times that each cacheable request has been made. Then, when the orchestration service computer 120 receives a request for the set of cacheable requests, it can use this information and use the frequency information to determine ones that are likely to be requested soon and that are not in the cache. In some embodiments, the orchestration service computer 120 can maintain a record of a period of time that cacheable requests are persisted in the cache (e.g., one day, one week). Alternatively, orchestration service computer 120 can send a prediction request message to the AI computer 130 to determine the set of cacheable requests.

In some embodiments, when using the AI computer 130 to determine the set of cacheable requests, the prediction request may be "What are the N cacheable requests most likely to be requested?" and the contextual data may be, for example, a time and date and other environmental contextual information that may be suitable for determine cacheable requests. An AI engine of the AI computer 130 can then run an appropriate learning model to determine the set of cacheable requests. Call prediction processing computer 170 may then receive the set of cacheable requests from the orchestration service computer 120. In a further embodiment, the call prediction processing computer 170 may send the prediction request for the set of cacheable requests to the AI computer 130 directly.

In step S706, call prediction processing computer 170 can select a cacheable request from the set of cacheable requests. For example, the call prediction processing computer 170 may select the first cacheable request from the set of cacheable requests. Alternatively, the call prediction processing computer 170 may prioritize the set of cacheable requests. For example, the set of cacheable requests may be prioritized by when the cacheable request is likely to be requested by a user or how frequently the cacheable request is requested. The call prediction processing computer 170 may then select the cacheable request that will likely be requested in the near future. The call prediction processing computer 170 may send the cacheable request to the AI computer 130 via the orchestration service computer 120 in a prediction request message. Alternatively, the call prediction processing computer 170 may send the cacheable request to the AI computer 130 directly. The cacheable request may be in the form of an AI call.

In step S708, the orchestration service computer 120 may send the cacheable request (in the form of an AI call) to the AI computer 130. Prior to sending the cacheable request to the AI computer 130, in step S710, the orchestration service computer 120 may retrieve contextual data for the cacheable request from the data repository 160. In some embodiments, the orchestration service computer 130 may determine and/or confirm that the cacheable request is cacheable. The AI computer 130 can use an AI engine to process the AI call with an AI model (e.g., a learning model comprising a neural network) or a combination of models and generate an output responsive to the prediction request message. After generating the output, the AI computer 130 may then send the output to the orchestration service computer 120.

The output may also include a period of time that the output should be persisted in the data repository. For example, the period of time may be 3 days, 1 week, 1 month, etc. The period of time may depend on the frequency with which the cacheable request is requested by users. For example, a cacheable request that is made hourly may be stored for 3 days or a week, while a cacheable request that is made weekly may be stored for one month. The period of time may also depend on the contextual data associated with the cacheable request. For example, an output may depend on contextual data that is refreshed monthly. Thus an output based on that contextual data may be cached for a time period of one month. In step S712, the orchestration service computer 120 may then return the output to the call prediction processing computer 170. The call prediction processing computer 170 may then receive the output.

In step S714, call prediction processing computer 170 may store the output in data repository 160. The call prediction processing computer 170 may also store the cacheable request in the data repository 160. In some embodiments, the call prediction processing computer 170 may be a producer that can send information to messaging system computer 140. When the call prediction processing computer 170 stores information in the data repository 160, the call prediction processing computer 170 may send a call information message to messaging system computer 140.

Embodiments of the invention provide a number of advantages. What are the advantages. By caching results, the time that is spent on generating predictions is spread out. Therefore, during peak times, the AI computer can experience less strain as some portion of the results will be precomputed and thus the AI engine does not need to compute all the results. The processor use is thus more consistent, as during off-peak times the AI computer can be put to use to reduce demands during peak times. Additionally, the prediction of the requests means that the information that is cached is going to be more useful. Use of a messaging system can free up the orchestration service computer to continue processing large amounts of prediction requests without waiting to confirm that the cacheable requests have been cached.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
determining, by a call prediction processing computer, that an AI computer is operating below a threshold processor usage;
based on the AI computer operating below the threshold processor usage:
sending, by the call prediction processing computer to the AI computer, a request for determining a set of cacheable requests that are most likely to be requested by users in the future, wherein, upon receiving the request, the AI computer determines the set of cacheable requests,
receiving, by the call prediction processing computer, the set of cacheable requests and contextual data respectively associated with each of the cacheable requests,
sending, by the call prediction processing computer, one or more cacheable requests from the set of cacheable requests and the contextual data respectively associated with each of the one or more cacheable requests to the AI computer for processing, wherein receiving the one or more cacheable requests and the contextual data causes the AI computer to process the one or more cacheable requests and the contextual data, to generate one or more outputs that are respectively responsive to the one or more cacheable requests and to generate, as a part of each of the one or more outputs, a persistence time period based on the contextual data corresponding to each cacheable request, and
receiving, by the call prediction processing computer, the one or more outputs generated by the AI computer for the one or more cacheable requests; and
storing, by the call prediction processing computer, each of the one or more outputs in a data repository in correspondence to the one or more cacheable requests for a duration of the persistence time period determined by the AI computer for each cacheable request,
wherein the data repository stores a plurality of outputs in correspondence to a plurality of prediction requests previously processed by the AI computer, the one or more outputs being added to the plurality of outputs,
wherein, based on receiving a first subsequent prediction request, which is a cacheable request and is included in the plurality of prediction requests, an output corresponding to the first subsequent prediction request is retrieved from the data repository without sending the first subsequent prediction request to the AI computer for processing, and
wherein the cacheable request is a prediction request, an output for which does not change over time.

2. The method of claim 1, wherein the threshold processor usage is about 20% or less.

3. The method of claim 1, wherein the output corresponding to the first subsequent prediction request is received from an orchestration service computer.

4. The method of claim 1, wherein the AI computer includes an artificial neural network.

5. The method of claim 1, wherein the sending the one or more cacheable requests further comprises sending the one or more cacheable requests to the AI computer via an orchestration service computer.

6. The method of claim 1, further comprising:
prior to the sending the one or more cacheable requests, prioritizing the set of cacheable requests to select the one or more cacheable requests.

7. The method of claim 1, wherein the sending the one or more cacheable requests further comprises continuously sending cacheable requests from the set of cacheable requests to the AI computer as for as long as the AI computer is below the threshold processor usage.

8. A system comprising:
a call prediction processing computer comprising a processor and a non-transitory computer-readable medium comprising code which, when executed by the processor, causes the processor to perform a method including:

determining that an AI computer is operating below a threshold processor usage;

based on the AI computer operating below the threshold processor usage:

sending, to the AI computer, a request for determining a set of cacheable requests that are most likely to be requested by users in the future, wherein, upon receiving the request, the AI computer determines the set of cacheable requests, receiving the set of cacheable requests and contextual data respectively associated with each of the cacheable requests, sending one or more cacheable requests from the set of cacheable requests and the contextual data respectively associated with each of the one or more cacheable requests to the AI computer for processing, wherein receiving the one or more cacheable requests and the contextual data causes the AI computer to process the one or more cacheable requests and the contextual data, to generate one or more outputs that are respectively responsive to the one or more cacheable requests and to generate, as a part of each of the one or more outputs, a persistence time period based on the contextual data corresponding to each cacheable request, and receiving the one or more outputs generated by the AI computer for the one or more cacheable requests; and storing each of the one or more outputs in a data repository in correspondence to the one or more cacheable requests for a duration of the persistence time period determined by the AI computer for each cacheable request, wherein the data repository stores a plurality of outputs in correspondence to a plurality of prediction requests previously processed by the AI computer, the one or more outputs being added to the plurality of outputs, wherein, based on receiving a first subsequent prediction request, which is a cacheable request and is included in the plurality of prediction requests, an output corresponding to the first subsequent prediction request is retrieved from the data repository without sending the first subsequent prediction request to the AI computer for processing, and wherein the cacheable request is a prediction request, an output for which does not change over time.

9. The system of claim 8, wherein the threshold processor usage is 20% or less.

10. The system of claim 8, wherein the output corresponding to the first subsequent prediction request is received from an orchestration service computer.

11. The system of claim 8, wherein the sending the one or more cacheable requests further includes sending the one or more cacheable requests to the AI computer via an orchestration service computer.

12. The system of claim 8, wherein the method further includes:

prior to the sending the one or more cacheable requests, prioritizing the set of cacheable requests to select the one or more cacheable requests.

13. The system of claim 8, wherein the sending the one or more cacheable requests further includes continuously sending cacheable requests from the set of cacheable requests to the AI computer for as long as the AI computer is below the threshold processor usage.

14. The method of claim 1, further comprising:

based on receiving a second subsequent prediction request, which is a cacheable request and is not included in the plurality of prediction requests previously processed by the AI computer, sending, by the call prediction processing computer, the second subsequent prediction request to the AI computer for processing, receiving, by the call prediction processing computer, an output that corresponds to the second subsequent prediction request and is generated by the AI computer, and storing the second subsequent prediction request and the output corresponding to the second subsequent prediction request in the data repository; and based on receiving a third subsequent prediction request that is a non-cacheable request, sending, by the call prediction processing computer, the third subsequent prediction request to the AI computer for processing, receiving, by the call prediction processing computer, an output that corresponds to the third subsequent prediction request and is generated by the AI computer, and omitting storing the third subsequent prediction request and the output corresponding to the third subsequent prediction request in the data repository, wherein the non-cacheable request is a prediction request, an output for which changes over time.

\* \* \* \* \*